United States Patent
Adachi et al.

[11] Patent Number: 5,914,549
[45] Date of Patent: *Jun. 22, 1999

[54] ALTERNATOR FOR MOTOR VEHICLES AND MANUFACTURING METHOD THEREOF

[75] Inventors: Katsumi Adachi; Kyoko Kurusu, both of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/687,959

[22] Filed: Jul. 29, 1996

[30] Foreign Application Priority Data

Jan. 8, 1996 [JP] Japan .................... 8-000783

[51] Int. Cl.$^6$ ............................................. H02K 5/00
[52] U.S. Cl. .............................. 310/89; 310/85; 310/91; 310/258
[58] Field of Search ...................... 310/91, 258; 248/635, 248/666, 674, 205.1; 123/195 A, 195 E, 198 R

[56] References Cited

U.S. PATENT DOCUMENTS

| | | | |
|---|---|---|---|
| 2,778,053 | 1/1957 | Hess et al. | 13/195 A |
| 4,849,665 | 7/1989 | Kitamura et al. | 310/68 D |
| 4,945,272 | 7/1990 | Ochi et al. | 310/91 |
| 5,629,575 | 5/1997 | Cazal et al. | 310/91 |

FOREIGN PATENT DOCUMENTS 2223131  3/1990  United Kingdom .

Primary Examiner—Thomas M. Dougherty
Assistant Examiner—Tran N Nguyen
Attorney, Agent, or Firm—Sughrue, Mion, Zinn, Macpeak & Seas, PLLC

[57] ABSTRACT

An alternator for motor vehicles having a housing for holding a stator between front and rear brackets comprising side mounting sections formed integrally with the front and rear brackets and having mounting holes to be directly mounted to an engine by mounting tools, wherein each mounting hole comprises at least three U-groove holes formed by a trimming die, provided through in a direction perpendicular to an axial direction of a rotary shaft of the alternator, and are opened in the same axial direction as the rotary shaft, the three holes being opened alternately in opposite directions one by one; and wherein at least one of the side mounting sections has positioning holes for positioning circumferentially the front and rear brackets provided through the mounting holes in the axial direction of the rotary shaft. Since the alternator has the mounting holes of superior vibration resistance formed by the trimming die in a casting, the number of working steps of the housing may be reduced and any defect in the manufacturing of the positioning holes associated with the mounting holes is prevented. As a result, the quality of the housing is improved.

3 Claims, 7 Drawing Sheets

ALTERNATOR FOR MOTOR VEHICLES AND MANUFACTURING METHOD THEREOF

BACKGROUND OF THE INVENTION

1. Field of the Invention

The present invention relates to an alternator for motor vehicles or the like, and a manufacturing method thereof. More particularly, the present invention is related to a mounting structure in the alternator for mounting the alternator to an engine and a manufacturing method thereof.

2. Description of the Related Art

Generally, in a conventional method for mounting an alternator to an engine of a motor vehicle, as the engine vibrates, this vibration is directed to the moving direction of pistons, i.e. to the alternator. As a result, the level of radial vibration is high. Further, in a multicylinder engine, because of a phase difference in the vertical motion of each piston, an axial vibration of the rotary shaft of the alternator can occur. Furthermore, a high engine speed can cause a strong vibration since the vibration level is directly proportional to the speed of the engine.

To cope with these drawbacks, U.S. Pat. No. 4,849,665 (the Japanese Utility Model Publication No.Hei 5-40686) discloses a mounting structure for mounting a bracket's flange by clamping it in a direction which is perpendicular to an axial direction of a rotary shaft of an alternator.

On the other hand, U.S. Pat. No. 4,945,272 (the Japanese Utility Model Publication No. Hei 6-6688) discloses a flange having a U-groove formed in a direction which is perpendicular to an axial direction of front and rear brackets, respectively. The flange is secured by a mounting bolt via screw-engagement. It is described in this patent that, for each mounting boss, an opening of the U-groove may be formed in one direction instead of alternately in the opposite direction. It is also described therein that the U-groove may be formed with its opening directed either leftward or downward.

In this field of art, there is a long felt need to use a structure which is strong and vibration resistant, has fewer machining steps for the entire housing, and is free from a manufacturing defect while providing mounting holes and positioning holes.

SUMMARY OF THE INVENTION

An object of the present invention is to provide an alternator for motor vehicles having a mounting structure, wherein the machining steps are reduced during the manufacturing process of the mounting structure.

Another object of the invention is to provide a method of manufacturing an alternator for motor vehicles which improves the efficiency and quality in the assembling process for the mounting structure.

A further object of the invention is to provide a method of manufacturing an alternator for motor vehicles having a mounting structure which increases the strength and vibration resistivity of the mounting structure, and which reduces the occurrence of a defect in the mounting hole by providing positioning holes common to the brackets.

In order to accomplish the foregoing objects, the present invention provides an alternator for motor vehicles having a housing for holding a stator between front and rear brackets, said alternator comprising a first side mounting section formed integrally with the front bracket and having mounting holes to be directly mounted to an engine by means of mounting tools; and a second side mounting section formed integrally with the rear bracket and having mounting holes to be directly mounted to an engine by means of mounting tools, wherein said mounting holes provided respectively in the first and second side mounting sections comprise at least three U-grooved holes formed by a trimming die and provided through in a direction perpendicular to the axial direction of a rotary shaft of the alternator and are opened in the same direction as the rotary shaft, the holes being opened alternately in opposite directions one by one, and wherein at least one of the side mounting sections has positioning holes for positioning circumferentially the front and rear brackets provided through the mounting holes in the axial direction of the rotary shaft.

Additionally, the present invention provides a method of manufacturing an alternator for motor vehicles having a housing for holding a stator between a front bracket and a rear bracket. In accordance with the invention, the method of manufacturing the alternator is characterized by a process of integrally forming a side mounting section with either a front bracket or a rear bracket by casting, the side mount forming process comprising the steps of: providing mounting holes in the side mount section drilling through in a direction perpendicular to an axial direction of a rotary shaft of the alternator and which holes are provided by trimming die in casting in a direction same as an axial direction of a rotary shaft; and providing positioning holes for positioning circumferentially the front and rear brackets drilling through in the axial direction of the rotary shaft.

Accordingly, the present invention achieves a mounting structure of superior vibrational resistance and forms mounting holes in the side mounting section by the trimming die in the casting, whereby not only the number of machining steps of the housing may be reduced but also any defect in the manufacturing of the positioning holes communicating with the mounting holes may be prevented, which improves product quality and reduces manufacturing cost.

DESCRIPTION OF THE PREFERRED EMBODIMENTS

Figure 10:
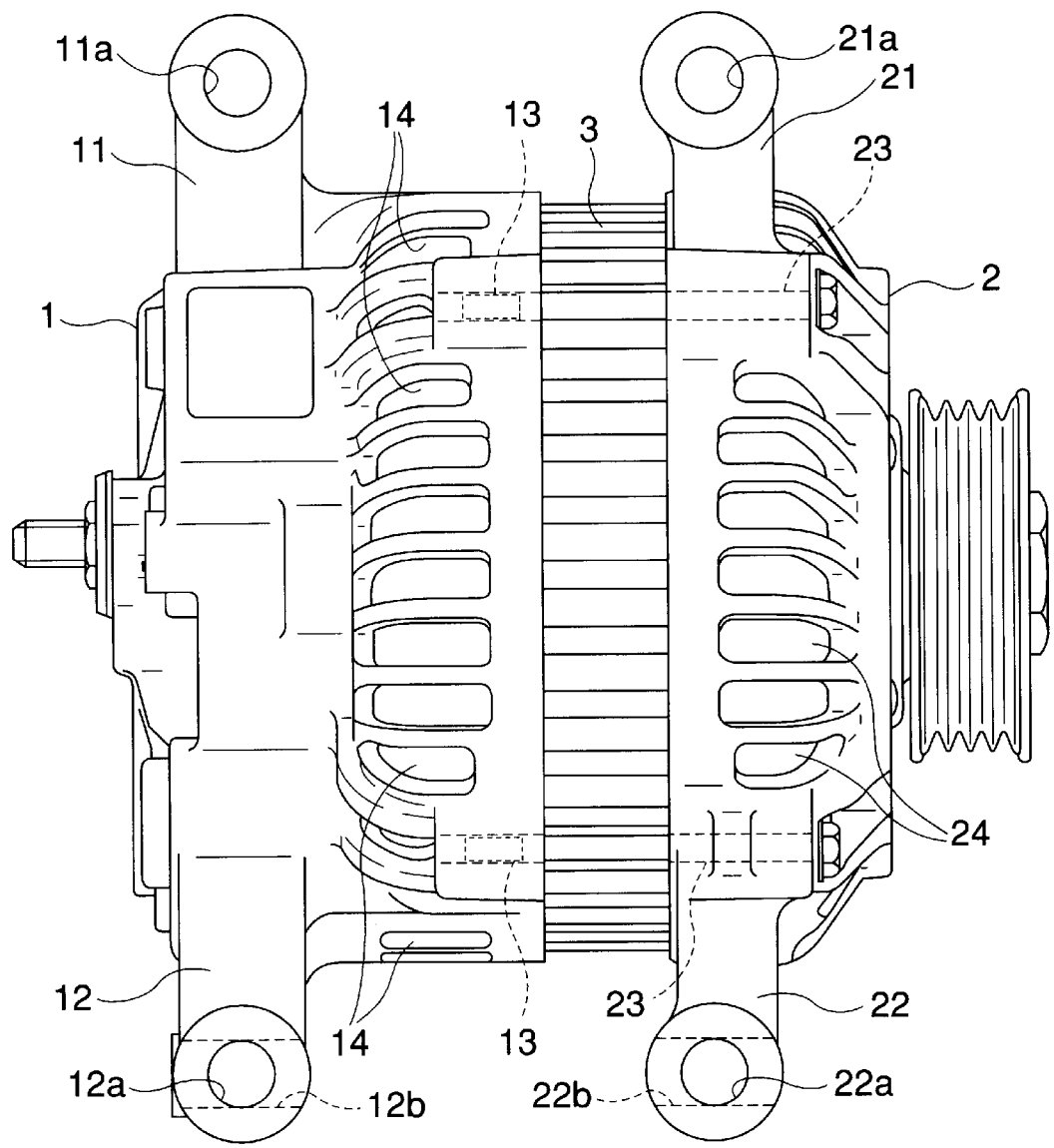
FIG. 10 is a front view of an alternator for motor vehicles according to the prior art.

A basic structure of an alternator for motor vehicles of this type is hereinafter described with reference to FIG. 10 to better understand the concept of the present invention. FIG. 10 is a front view showing an alternator of a conventional side mounting type, and FIG. 11 is a left side view thereof.

Figure 11:
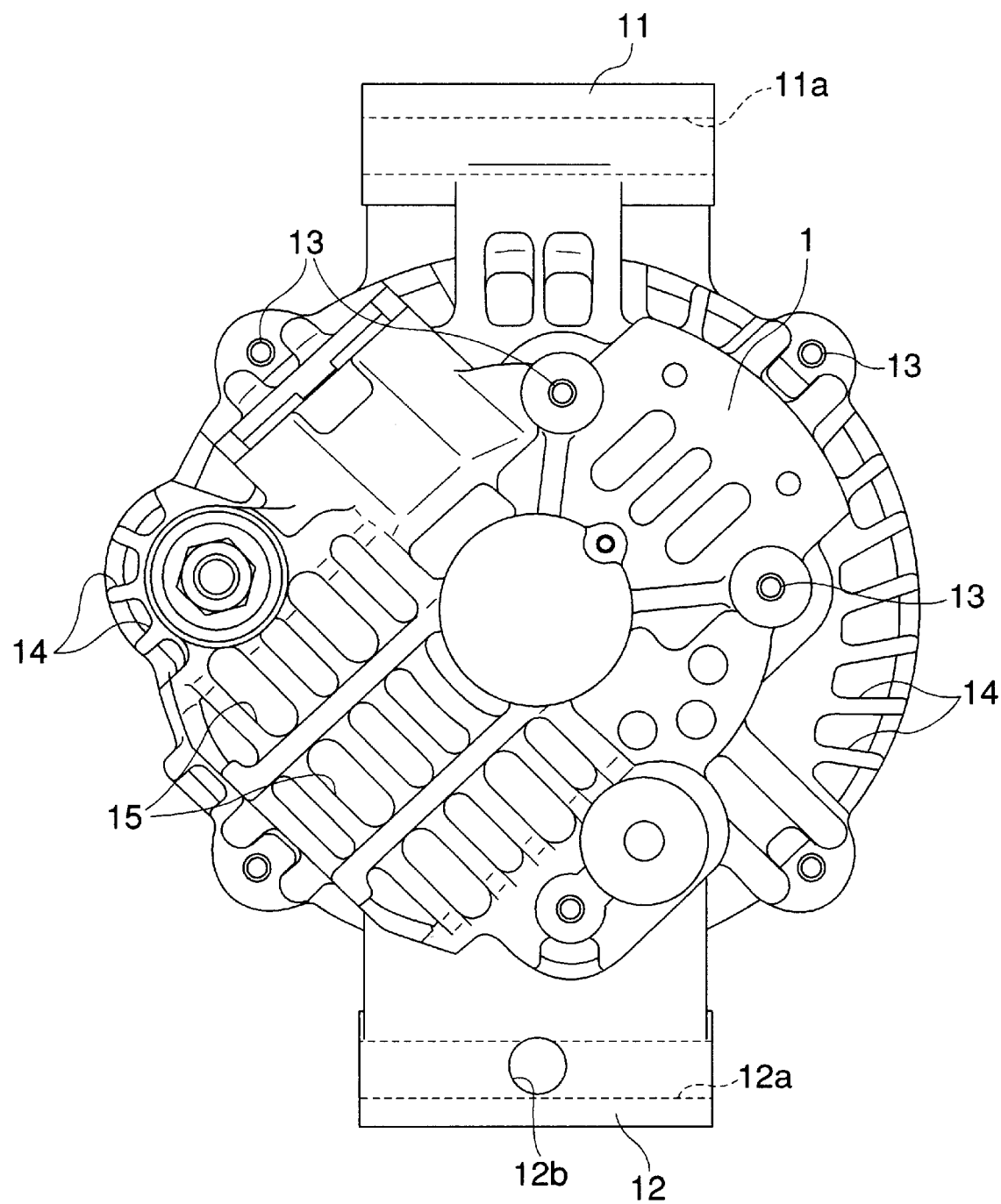
FIG. 11 is a left side view of the alternator for motor vehicles shown in FIG. 10.

In FIGS. 10 and 11, a rear bracket 1 is located on the left side of a housing of the alternator and has side mounting sections 11, 12 projecting vertically at two points in radial direction, and putting a rotary shaft therebetween. Tapped holes 13 are used for fixing a stator or other parts incorporated, or for assembling one housing with another. Intake windows 14 are used for sucking a cooling air, and exhaust windows 15 are used for exhausting the air.

Likewise, the front bracket 2 is located on right side of the housing of the alternator and has side mounting sections 21, 22 projecting vertically at two points corresponding to the side mounting sections 11, 12 of the rear bracket 1. Tapped holes 23, and intake windows 24 respectively correspond to the tap holes 13 and the intake windows 14 of the rear bracket 1.

The side mounting sections 11, 12, 21, 22 are respectively disposed in parallel to each other, and each of the side mounting sections respectively having mounting holes 11a, 12a, 21a, 22a which are perpendicular to the rotary shaft. The side mounting sections 11, 12, 21, and 22 are mounted directly to an engine by mounting means such as a bolt. An improvement to the mounting holes is described later.

In the basic structure described above, the number of mounting parts on the engine side may be reduced, whereby the entire alternator may be small-sized as compared with any alternator for motor vehicles not being of side mount type. Furthermore, integration or unification between the alternator and the engine is more increased resulting in advantages such as superior vibration resistance, smaller vibration.

A conventional manufacturing process of the housing is briefly described below. The housing is usually formed by aluminum die casting comprising the steps of casting a molten aluminum into a die, forming intake and exhaust windows, and treating tapped holes and end faces by machining.

More specifically, it is conventional to form side mounting sections 11, 12, 21, and 22, intake windows 14, and 24, and exhaust windows 15 by casting, and to form tapped holes 13, and 23, and mounting holes 11a, 12a, 21a, and 22a by machining.

On the principle of die casting, the shape of a section formed by casting is necessarily tapered in one direction.

In the assembling step, it is necessary that the rear bracket 1 and the front bracket 2, both of which incorporate internal parts of the alternator therein, are assembled through accurate positioning of the tapped holes 13, and 23 at the time of holding a stator 3 therebetween.

For the purpose of accurately positioning the rear bracket 1 and front bracket 2 in circumferential direction, there are several methods such as providing positioning holes 12b, 22b in the axial direction of the rotary shaft or performing an accurate machining by establishing, for instance, an end face of the side mounting section as a reference surface.

However, one of the problems of the conventional manufacturing process of the housing, as illustrated in FIGS. 10 and 11, is that although it is possible to machine the holes other than the mounting holes of the side mounting section in one step because they are located in the axial direction, it is necessary to machine separately the mounting holes of the side mounting section because they are located in the radial direction. Further, since the machining of the end face of the mounting holes is essential for an accurate positioning of the front and rear brackets, another problem exists in that the machining steps are increased.

Moreover, in the machining step of the positioning holes, barr takes place in the internal part of the mounting holes perpendicular to the positioning holes, thereby adversely affecting the assembling work and product quality.

Figure 1:
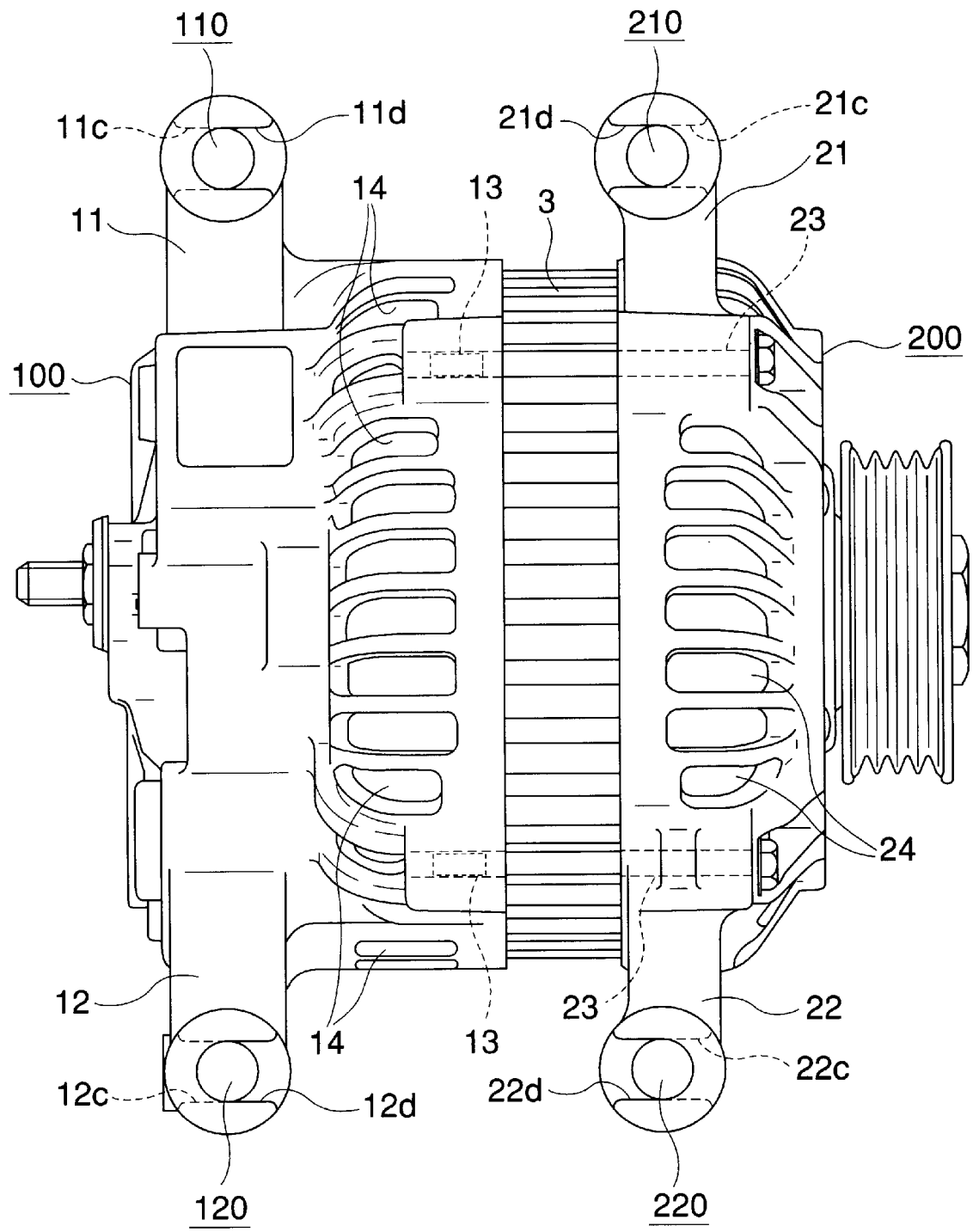
FIG. 1 is a front view of an alternator for motor vehicles showing an example in accordance with the present invention.
Figure 2:
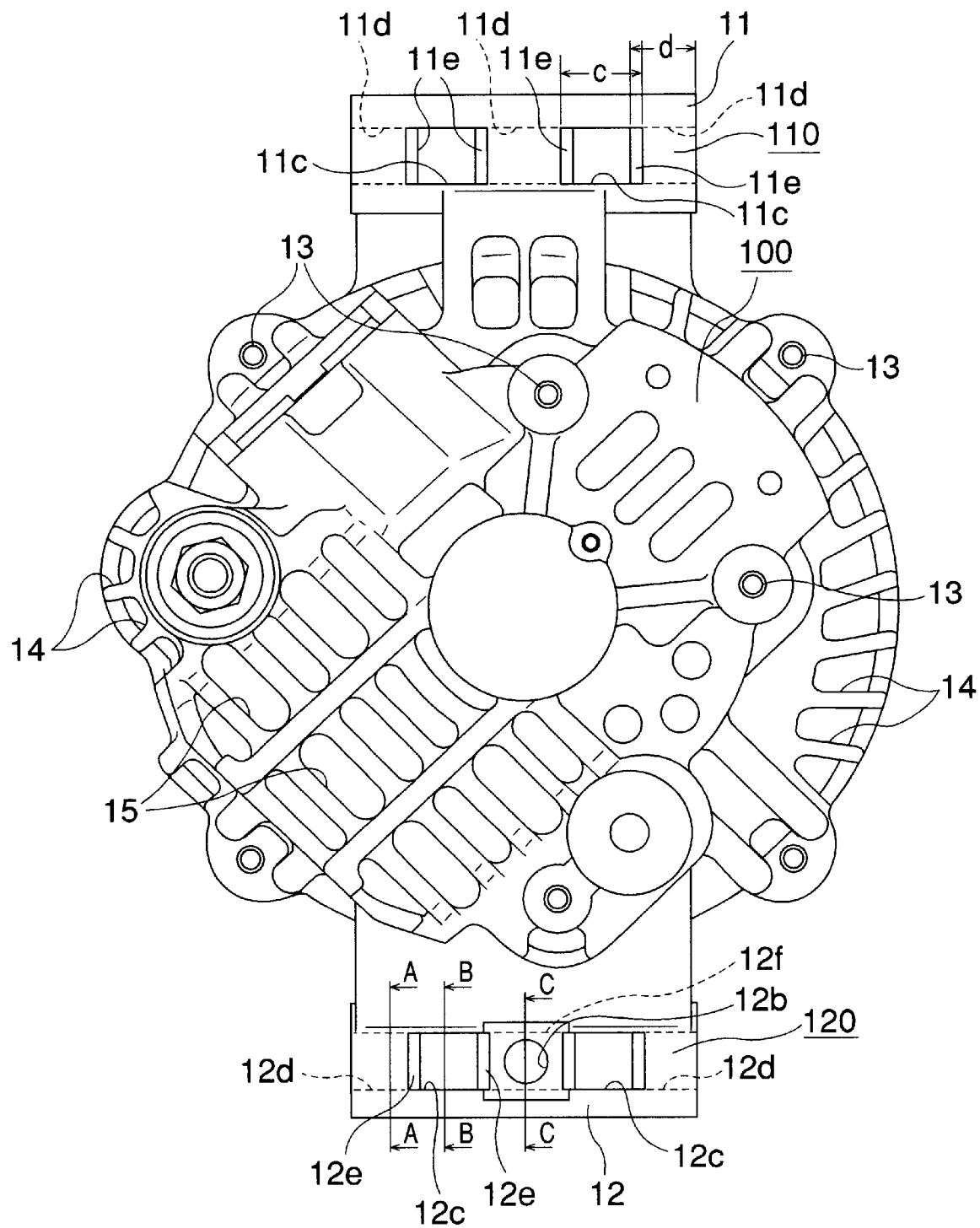
FIG. 2 is a left side view of the alternator for motor vehicles shown in FIG. 1.

FIG. 1 is a front view of an alternator for motor vehicles showing an example of the invention in which the aforementioned problems are solved, and FIG. 2 is a left side view thereof.

In the rear bracket 100 and the front bracket 200, holes 11c, 11d, 12c, 12d, 21c, 21d, 22c, and 22d, which are formed by the trimming die in the casting, are opened in the same direction as the axial direction of the rotary shaft. Thus, each side mounting section is provided with plural U-groove holes opening leftward and rightward (see FIG. 1).

Since the holes formed by the trimming die in the casting are of the same direction as the axial direction of the rotary shaft, and since the trimming direction is the same as that of the other components such as intake windows it is possible to form the holes by the trimming die while the windows are formed by casting. It is not necessary to carry out any additional casting or machining step.

More specifically, referring to the side mounting section 11 in FIG. 1, the trimming die is drawn so that the U-groove shape of the hole 11d formed by the trimming die and located on this side is opened rightward, and the U-groove shape of the hole 11c formed by the trimming die and located on the other side is opened leftward.

Accordingly, the holes formed by at least two types of trimming dies to be opened rightward and leftward are provided on each side mounting section.

As a result, two holes 11c and three holes 11d, being five holes in total, are formed by the trimming die in the side mounting section 11. The holes 11d formed by the trimming die in the side mounting section 11 are disposed opposing to the holes 21d formed by the trimming die in the side mounting section 21 holding a plane perpendicular to the axial direction of the rotary shaft therebetween.

Figure 3:
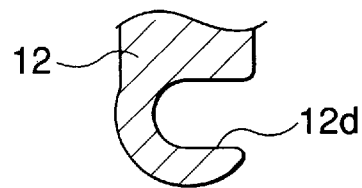
FIG. 3 is a sectional view taken along the line A—A in FIG. 2.

FIG. 3 is a sectional view taken along the line A—A in FIG. 2 and showing a side shape of the hole 12d formed by the trimming die, and in which external shape of the top end of the side mounting section 12 is cylindrical, and the internal shape is a U-groove opening rightward.

Figure 4:
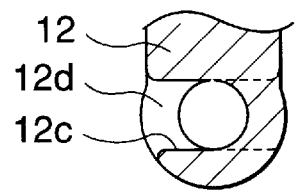
FIG. 4 is a sectional view taken along the line B—B in FIG. 2.

FIG. 4 is a sectional view taken along the line B—B in FIG. 2 and showing a sectional shape of the hole 12c formed by the trimming die, and in which the external shape of the top end of the side mounting section 12 is formed to be cylindrical together with the hole 12d, and the internal shape is a U-groove opening leftward.

The holes 11c and 11d in FIG. 1 formed by the trimming die and which open toward the opposite direction from each other, are partially lapped as shown in the side view of FIG. 2, and reference numeral 11e designates a lap portion. This lap portion 11e is disposed so that the hole 11d and the hole 11c both formed by the trimming die are partially lapped with each other and, as a result, four lap portions are formed. Each lap portion lie has a small gap which enables the die to be drawn easily, and prevents the production of the barr.

Figure 5:
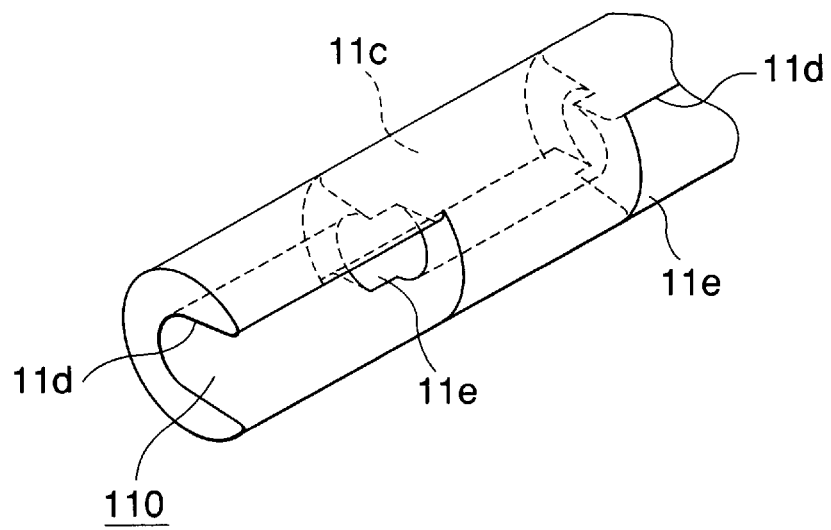
FIG. 5 is a partially enlarged perspective view of the side mounting section shown in FIG. 1.

FIG. 5 is an enlarged perspective view of an essential section of a structure of a lap portion 11e, and in which a hole 11d is opened on one side, a hole 11c is opened on the opposite side, and the lap portion 11e extends over both holes 11c and 11d.

The cylindrical part has a mounting hole 110 perpendicular to the axial direction.

In this manner, the side mounting section has five holes formed by the trimming die so as to be open in parallel to the axial direction of the rotary shaft, and one mounting hole formed to be perpendicular to the axial direction of the rotary shaft.

In the same manner, the remaining side mounting sections 21, and 22 are also provided with mounting holes 210, and 220 formed by the trimming die in the casting.

In the side mounting section 12, for the purpose of positioning the rear bracket 1 and front bracket 2, positioning holes 12b, and 22b are formed in the axial direction as shown in FIGS. 1 and 2, and a through bolt (not illustrated), for example, is inserted through these positioning holes and fixedly clamped.

Figure 6:
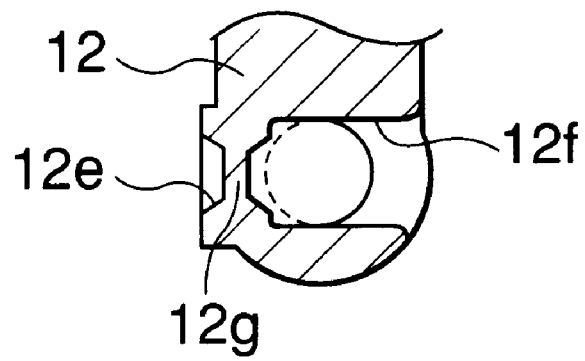
FIG. 6 is a sectional view taken along the line C—C in FIG. 2 before forming the positioning holes.
Figure 7:
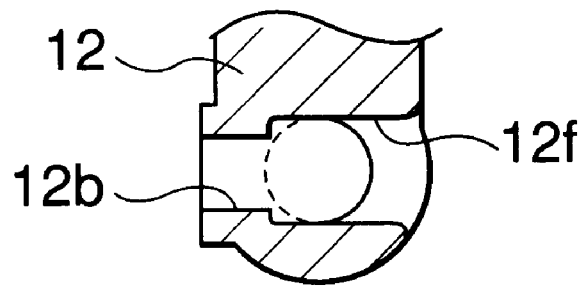
FIG. 7 is a sectional view taken along the line C—C in FIG. 2.

FIG. 6 is a sectional view showing a formation step of the positioning hole 12b. First, holes 12f, and 12e are formed by the trimming die in the same manner as the foregoing holes oppositely provided. The hole 12e has an opening leftward, and the hole 12f has an opening rightward. Then, a part 12g located between the back sides of the holes 12e and 12f is machined, thereby forming the positioning hole 12b as shown in FIG. 5 which is a sectional view taken along the line C—C.

In the same manner, the positioning hole 22b in the side mounting section 22 is formed by machining.

In the method of forming the positioning holes of the side mounting sections as described above, the internal part of the elongated mounting holes 120, and 220 are prevented from producing the barr otherwise at the time of machining the positioning holes 12b, and 22b, thereby allowing an efficient assembling at the time of inserting a bolt through the mounting hole.

Although four side mounting sections are formed on the brackets of the housing in the foregoing example as shown in FIG. 1, it is also preferable to increase or decrease the side mounting section such that each one side mounting section is formed respectively on the rear bracket 1 and the front bracket 2, for example. In this case, only the side mounting sections 12 and 21 are formed.

Further, it is not always necessary to provide the positioning holes 12b, and 22b only in the side mounting sections 12, and 22. For instance, the positioning holes 12b, and 22b may be provided in one of the side mounting sections 11, and 21, or in both.

Figure 8:
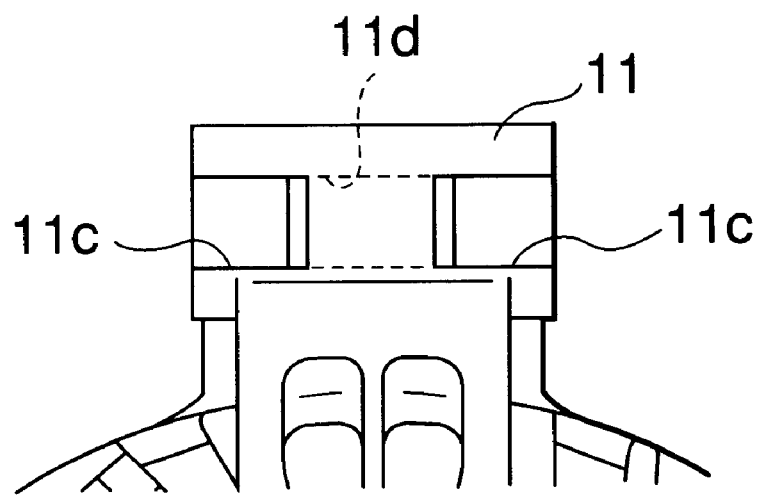
FIG. 8 is a left side view of the side mounting section showing another example in accordance with the invention.
Figure 9:
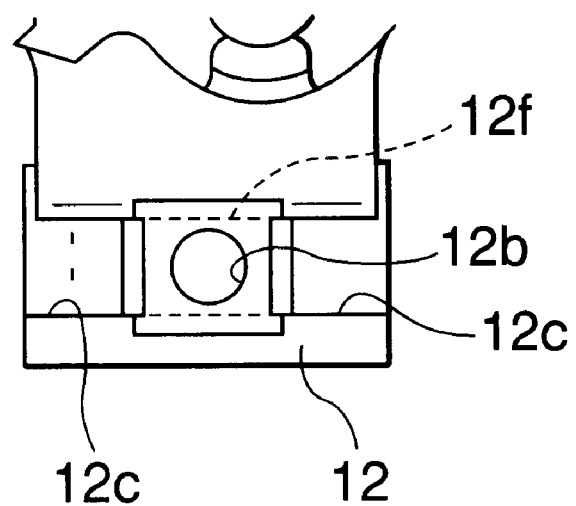
FIG. 9 is a left side view of the side mounting section showing a further example in accordance with the invention.

Depending upon the dimensions of the alternator, it is also preferable to provide at least three holes 11c, 11d and 11c which are formed by the trimming die in the side mounting section 11 so that the three holes may be opened alternately in the opposite direction (see FIG. 8). In the same manner, it is also preferable that three holes 12c, 12f and 12c which are formed by the trimming die are provided in the side mounting section 12, and that the positioning hole 12b is provided on the hole 12f, as shown in FIG. 9.

The advantages of the present invention are such that it is now possible to provide the mounting holes in the side mounting sections by the trimming die in the casting to prevent any defect in the manufacturing the positioning holes associated with the mounting holes, to improve the quality of the housing, to reduce number of working steps of the housing, and to reduce manufacturing cost of the entire housing.

What is claimed is:

1. An alternator for motor vehicles having a housing for holding a stator between front and rear brackets, comprising:

a first side mounting section formed integrally with the front bracket and having mounting holes to be directly mounted to an engine by means of mounting tools, wherein one mounting hole is a through-hole; and a second side mounting section formed integrally with the rear bracket and having mounting holes to be directly mounted to an engine by means of mounting tools, wherein one mounting hole is a through-hole;

wherein each of said mounting holes provided respectively in the first and second side mounting sections comprise at least three U-groove holes formed by a trimming die and provided through in a direction perpendicular to an axial direction of a rotary shaft of the alternator and said U-groove holes are opened in the same direction as the axial direction of the rotary shaft, each of said U-groove holes being opened alternately in opposite directions, and wherein at least one of the side mounting sections has positioning holes for positioning circumferentially the front and rear brackets through the mounting holes in the axial direction of the rotary shaft.

2. An alternator for motor vehicles as set forth in claim 1, wherein each of said mounting holes formed by said trimming die is of U-groove shape provided in the same direction as intake and exhaust windows which are formed in the same direction as the axial direction of the rotary shaft.

3. An alternator for motor vehicles as set forth in claim 1, wherein said one U-groove hole opening in opposite direction is partially lapped through a lap portion between one of remaining U-groove hole openings in a first direction and one of the remaining U-groove hole openings in a second direction.

* * * * *